Aug. 10, 1926.

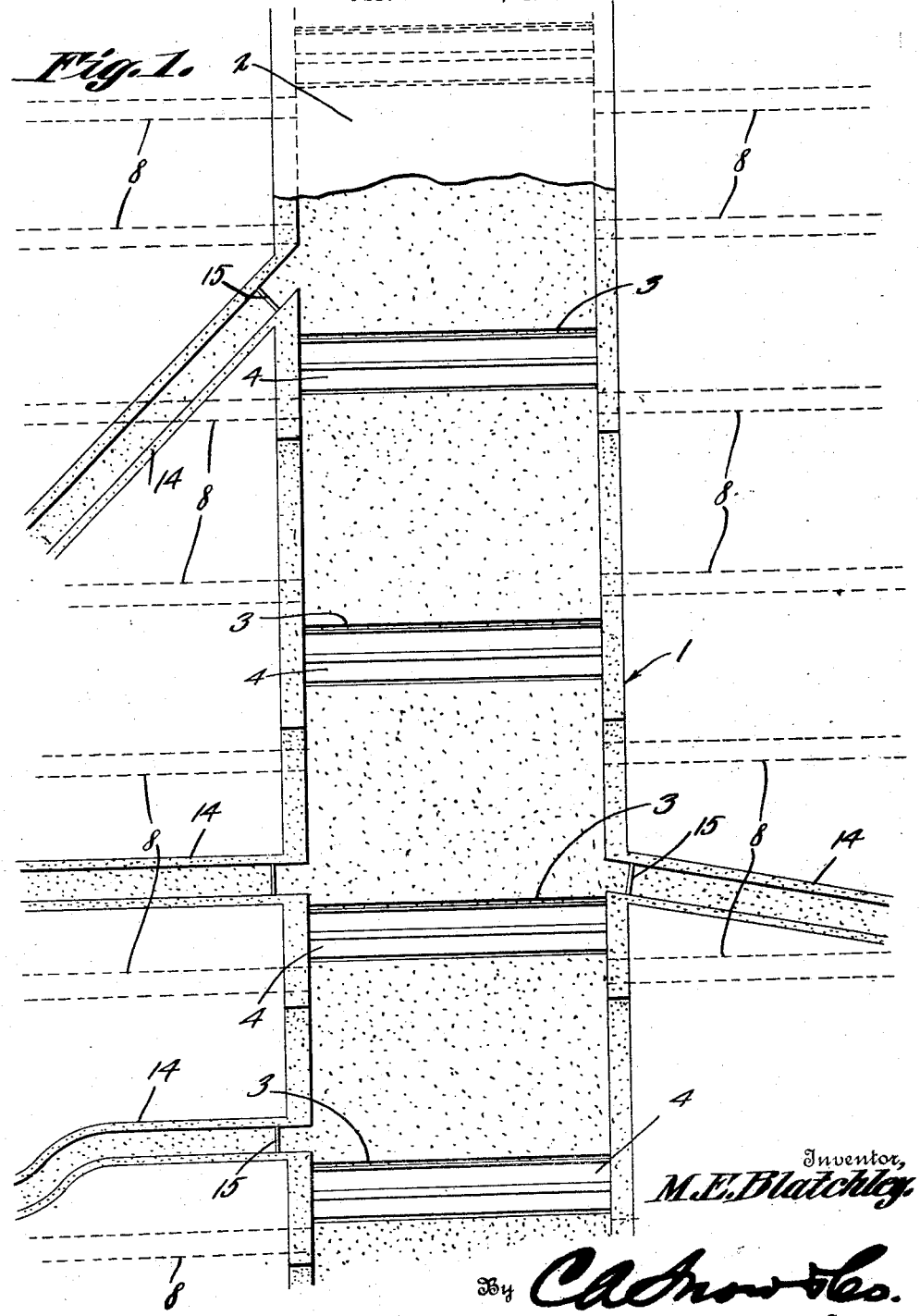

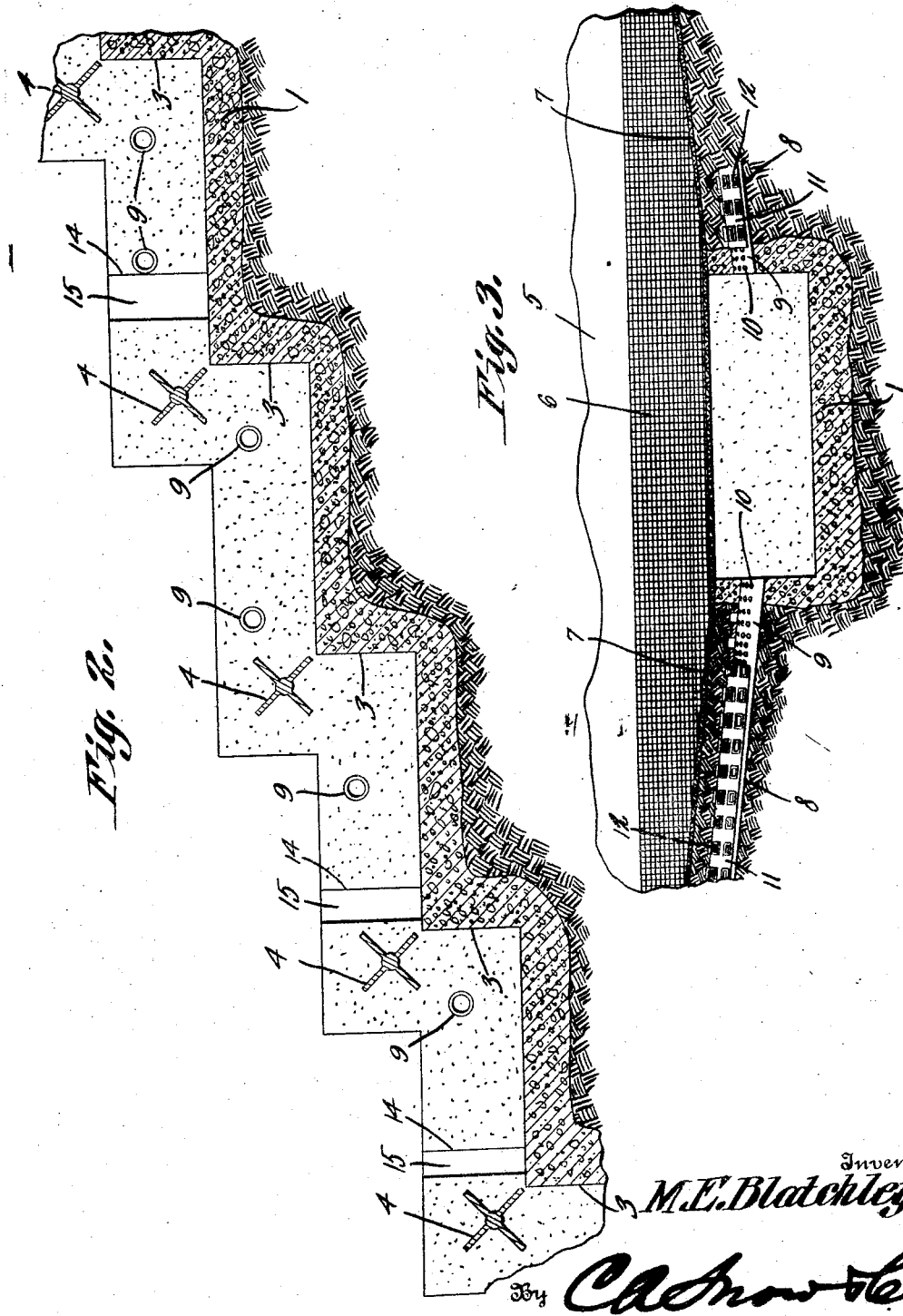

M. E. BLATCHLEY 1,595,376

HYDRAULIC SYSTEM

Filed Nov. 22, 1922

3 Sheets-Sheet 3

Inventor,
M. E. Blatchley,
By C. A. Snow & Co.
Attorneys

Patented Aug. 10, 1926.

1,595,376

UNITED STATES PATENT OFFICE.

MELBOURNE E. BLATCHLEY, OF GARDEN CITY, KANSAS.

HYDRAULIC SYSTEM.

Application filed November 22, 1922. Serial No. 602,665.

This invention aims to provide novel means for collecting and utilizing sub-surface water, in localities where surface water may not be available.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 6:
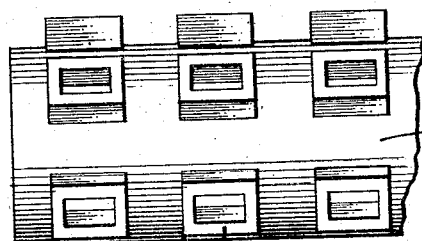
Figure 7:
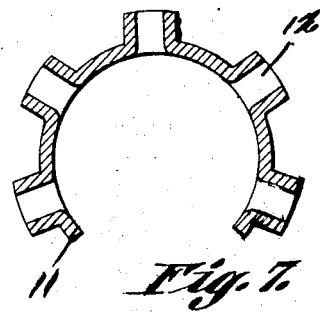
Figure 4:
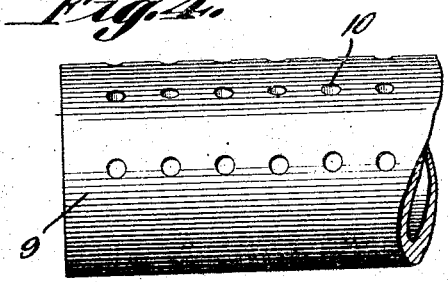
Figure 5:
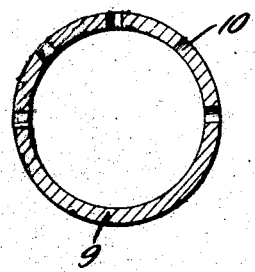

Figure 1 shows in diagrammatic plan, a portion of a device constructed in accordance with the invention; Figure 2 is a longitudinal section taken through the main channel; Figure 3 is a transverse section taken through the main channel, and disclosing the bank at one end of the main channel; Figure 4 is an elevation showing one of the tiles in which the water is received initially; Figure 5 is a cross section of the element depicted in Figure 4; Figure 6 is a plan disclosing one of the guards; Figure 7 is a cross section of the structure shown in Figure 6.

Referring to Figures 1 to 7, there is provided a main channel 1 of any desired length, made of concrete or otherwise, and covered, if desired, as denoted by the numeral 2 in Figure 1, the main channel 1 being provided with steps 3, forming water falls adapted to operate water motors 4 supported in the main channel 1. The sloping wall at the upper end of the main channel 1 is marked by the numeral 5 in Figure 3 and may be covered by a wire netting 6, extended laterally along the surface of the soil, as shown at 7, the function of the netting being to prevent the earth from washing into the channel 1.

Laterally disposed outwardly inclined channels 8 are located beneath the surface of the soil and communicate with the main channel 1. The lateral auxiliary or collecting channels 8 may be made of tubes 9, in the form of tiles, having perforations 10 in their upper portions, the lower portions of the tiles or tubes being imperforate. The tiles 9 which form the lateral inlet channel 8 are shielded by guards 11 having outwardly projecting sleeves 12, the sleeves or nipples 12 serving to prevent dirt from finding its way through the perforations 10 of the tiles. The main channel 1 has lateral outlets 14 controlled by gates 15.

In practical operation, the water beneath the surface of the soil is collected in the channels 8 and flows into the main channel 1. The water, traversing the main channel 1 may be used to operate the motors 4, and, upon occasion, the gates 15 may be opened, thereby permitting the water to flow from the main channel 1 into the outlets 14, to be used for irrigation or for any other purpose.

What is claimed is:—

A device of the class described, comprising an open main channel, lateral delivery channels communicating with the main channel, and lateral collecting pipes embedded in the ground and provided in their tops with perforations, the bottoms of the collecting pipes being imperforate, and trough-shaped guards fitting on the upper portions of the collecting pipes and provided with openings, the guards having outstanding tubular sleeves disposed about the openings.

In testimony that I claim the foregoing as my own, I have hereto affixed my signature.

MELBOURNE E. BLATCHLEY.